UNITED STATES PATENT OFFICE.

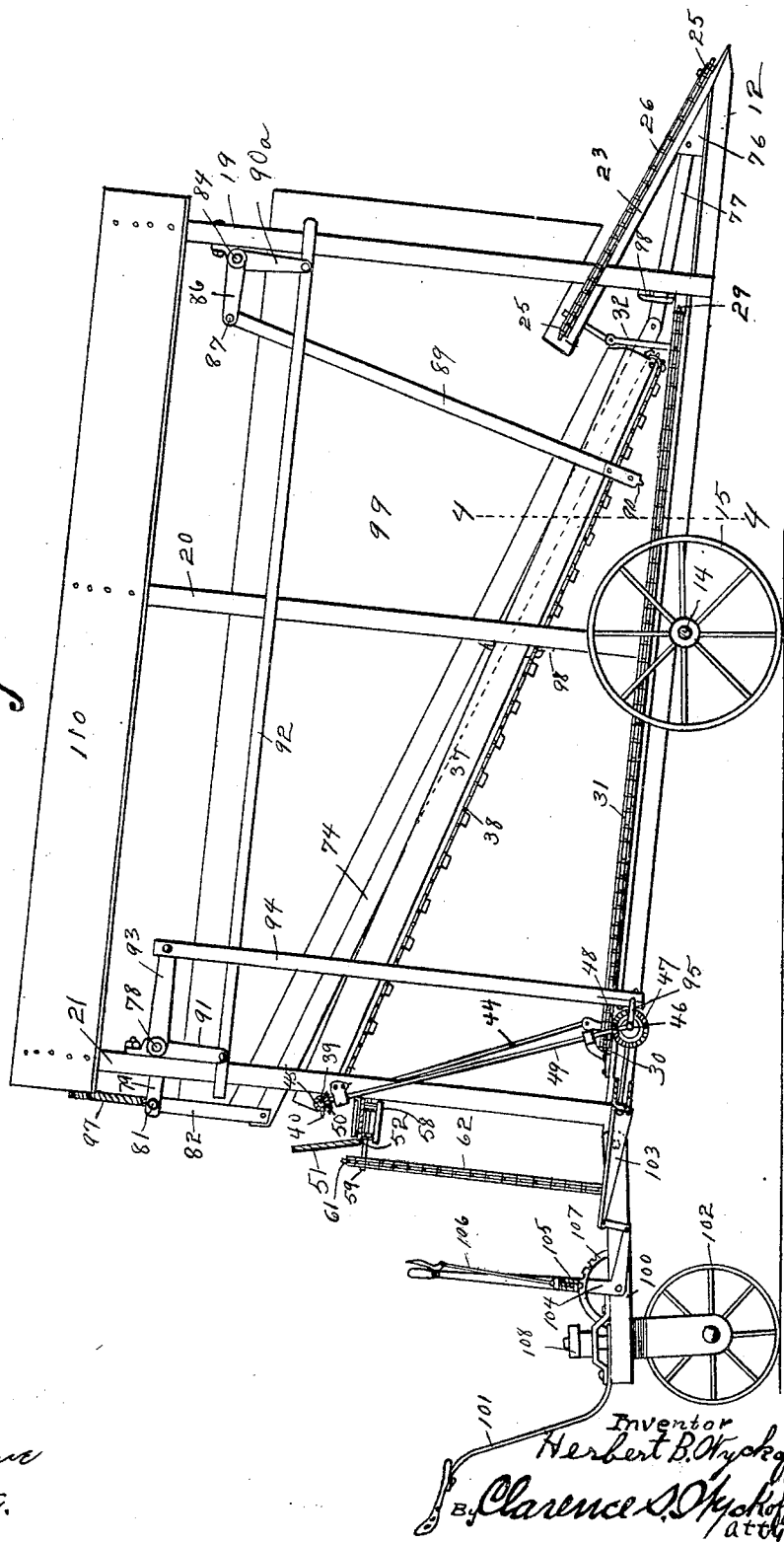

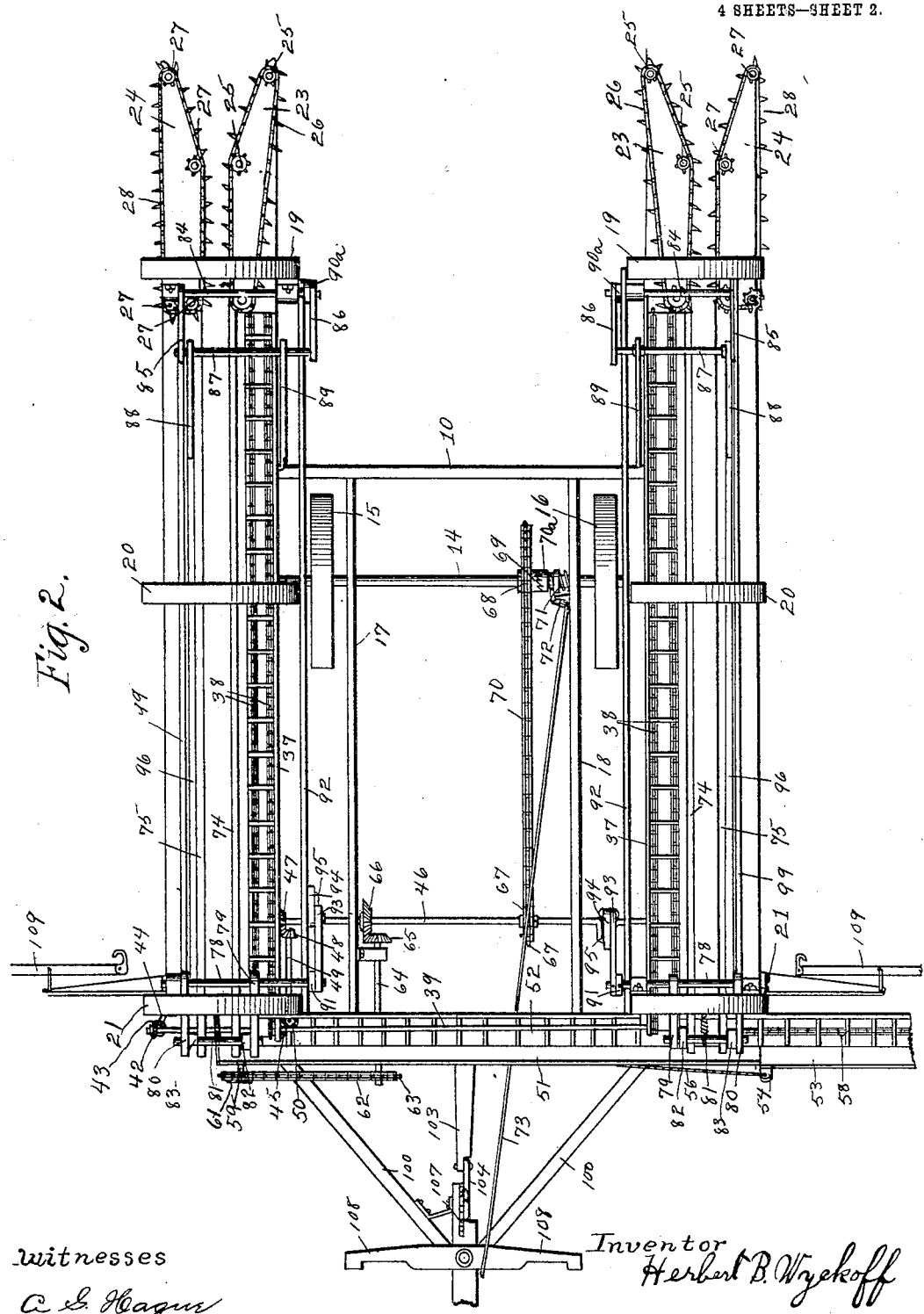

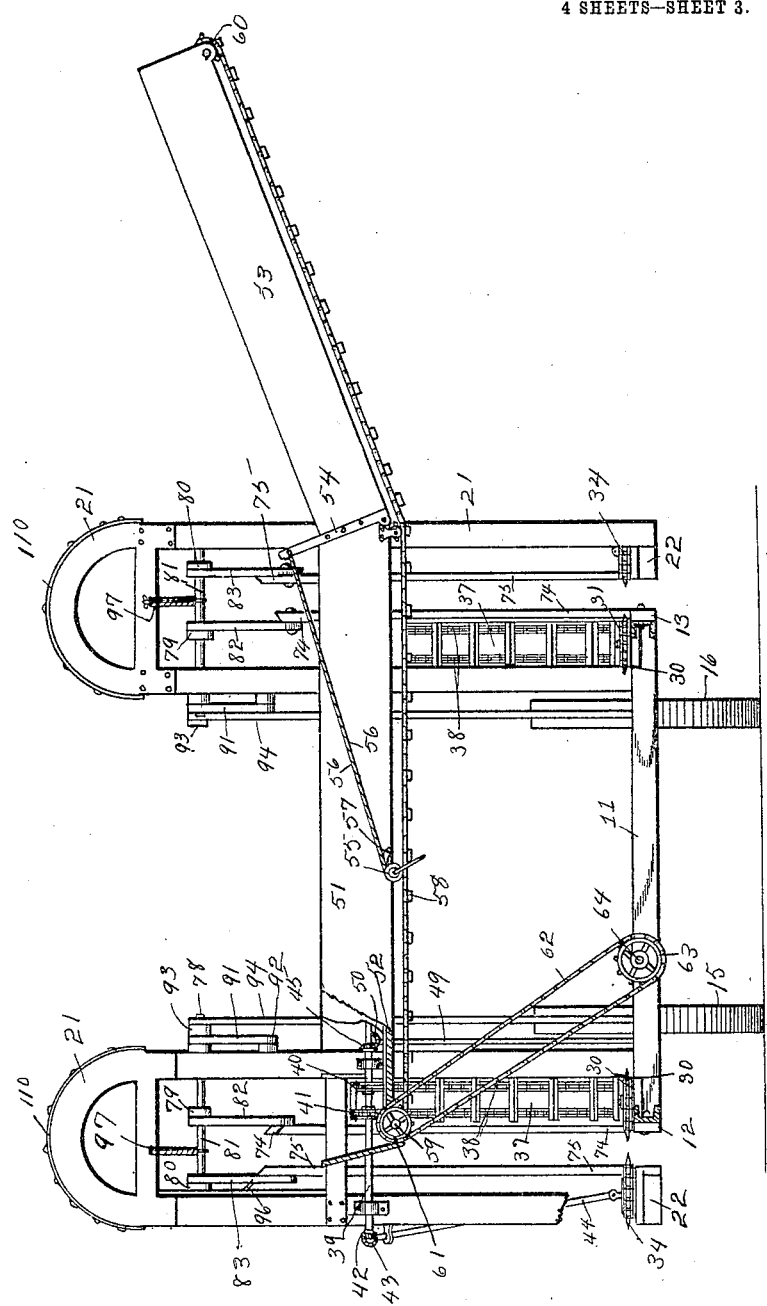

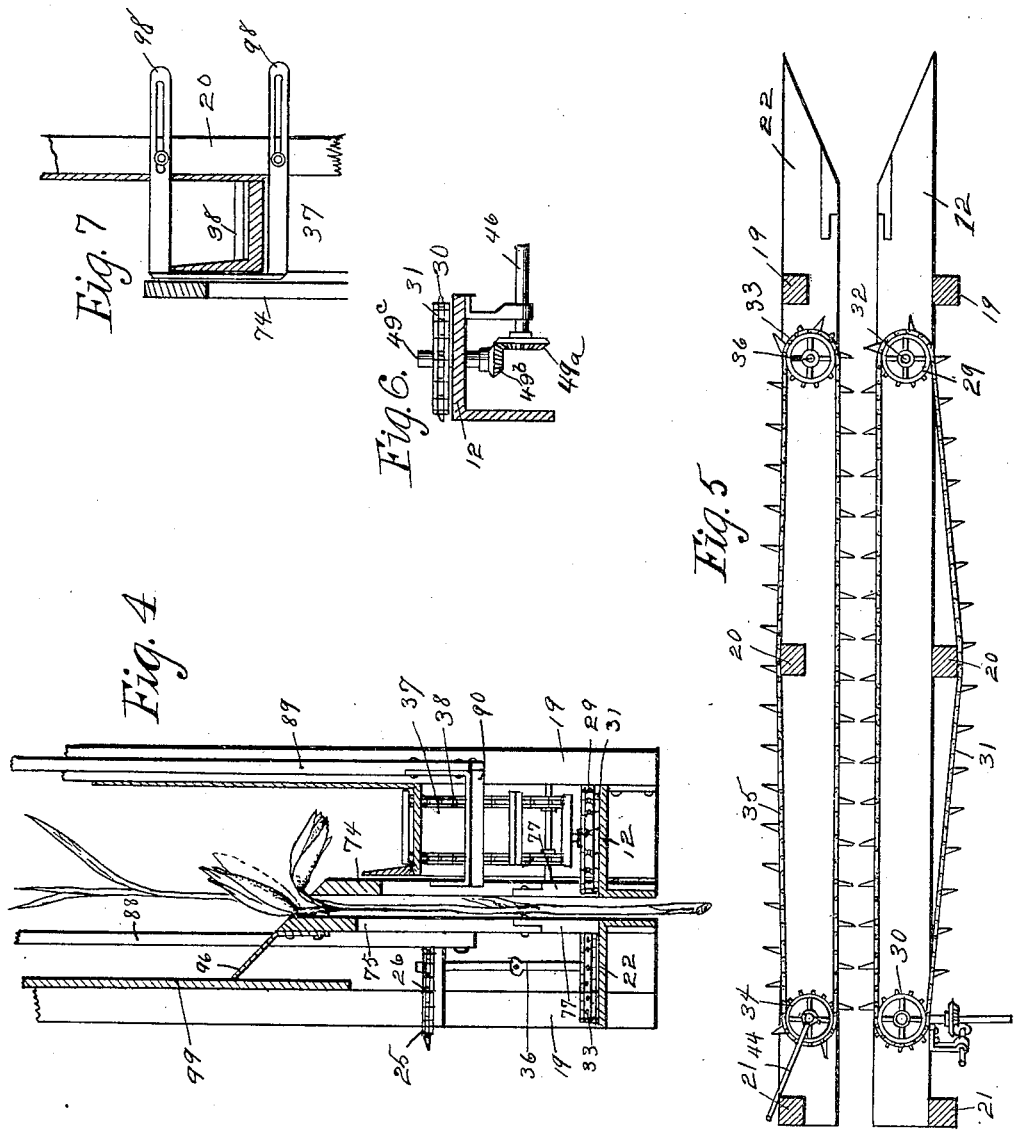

HERBERT B. WYCKOFF, OF CINCINNATI, IOWA.

CORN-HARVESTER.

No. 800,704.  Specification of Letters Patent.  Patented Oct. 3, 1905.

Application filed June 2, 1904. Serial No. 210,791.

*To all whom it may concern:*

Be it known that I, HERBERT B. WYCKOFF, a citizen of the United States, residing at Cincinnati, in the county of Appanoose and State of Iowa, have invented a certain new and useful Corn-Harvester, of which the following is a specification.

The objects of my invention are to provide a machine for harvesting corn of simple, durable, and inexpensive construction, the parts of which are so constructed and arranged that the machine is adapted for causing the stalks of corn to be drawn between the gathering-arms regardless of the position in which the corn is standing relative to the ground-surface and force the stalks between these gathering-arms and between the snapping-bars, which are at the rear of the gathering-arms, and as the machine advances over the ground-surface to cause these snapping-bars to operate so as to snap the ear of corn from the stalk and allow it to fall onto an elevator, which carries it to a side delivery-conveyer.

A further object is to provide inclined snapping-bars which are so constructed that the ear of corn will be snapped from the stalk when the ear reaches a point where it is in engagement with the upper portion of the snapping-bars by a sudden jerk caused by the rapid vertical movement of these snapping-bars as the harvester is advanced over the ground-surface.

A further object is to provide means for raising or lowering the forward end of the harvester so as to cause the gathering-arms to be adjacent to or some distance away from the ground-surface when the harvester is in operation.

A further object is to provide a steering apparatus which can be easily and readily operated from the rear of the harvester by the operator, who has his seat preferably at the rear of the machine.

Further, it is my object to provide a harvester of light construction the parts of which are so geared together that they are all operated directly from the main driving-shaft of the harvester, and, further, to provide means for throwing the entire operative parts of the harvester into or out of operation.

A further object is to provide conveyers the outer one of which can be raised or lowered at the pleasure of the operator and is thus adapted to be used with any wagon.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 is a side elevation inside of one of the stalk-receiving frames. Fig. 2 is a plan of the same, the seat, however, in this view being broken away. Fig. 3 is a rear elevation of the harvester with the device for raising and lowering the forward end of it and the operator's seat cut away and also other parts cut away to show some of the working mechanisms. Fig. 4 is a sectional view of one side of the machine cut on the line 4 4 of Fig. 1 and is designed to show the way in which the snapping-bars operate and to show the mechanism for operating the snapping-bars and the elevator. Fig. 5 is a longitudinal sectional view of one side of the machine cut in such a way as to show the toothed advancing-chains which are mounted above the bottom of each side of the frame. Fig. 6 is a detail view of the gearing which drives one pair of the toothed advancing-chains; and Fig. 7 is a detail view of an elevator, showing one of the means for adjusting the snapping-bars relative to each other.

Referring to the accompanying drawings, it will be seen that I have provided a frame comprising the forward end portion 10, the rear end portion 11, the two sides 12 and 13, which are connected with each other by means of the forward end portion 10 and the rear end portion 11. Extending between the side portions 12 and 13 and mounted therein is the main driving-shaft 14, upon which the traction-wheels 15 and 16 are mounted. Extending longitudinally of the frame and connecting the ends 10 and 11 are the braces 17 and 18, through which the shaft 14 passes. Each of the side portions of the frame 12 and 13 extends some distance in front of the end portion 10, so as to form one side of the stalk-receiving frame. Extending upwardly from the side 12 and attached thereto are the substantially U-shaped members 19, 20, and 21, each of said U-shaped members having attached to their free ends, substantially parallel with the side portion, the outer sides 22 of the stalk-receiving frame at the left side of the machine. This outside portion 22 is positioned a slight distance away from the inside portion 12 and yet a sufficient distance away from it so that several stalks of corn can pass between these portions as it is advanced over the ground-surface—that is, so hills of corn can be received easily between these parts 21 and 12. The forward portions of the sides 12 and 22 of the stalk-receiving frame on the left side of the machine are cut away at their forward ends to form a substantially V-shaped opening between them so constructed as to allow the stalks in a hill of corn, even though they are separated some distance to be received in this V-shaped opening and drawn together as the machine is advanced over the ground-surface, and thus force the stalks between the sides 12 and 22. The lower forward portions of these sides 22 and 12 are curved upwardly to form a runner, so that there will be no danger of these side portions digging into the ground as the machine is drawn forwardly over the ground-surface.

Inasmuch as the stalk-receiving frame on the right side of the machine is constructed exactly like the stalk-receiving frame on the left side of the machine, I do not deem it necessary to explain the construction of but one side of these stalk-receiving frames and the mechanism connected therewith. It is to be understood throughout the entire specification that the description of the one on the left side of the machine applies to the description of the other at the right side of the frame.

Mounted at the front end of the stalk-receiving frame on the left side of the machine and connected with the extreme forward ends of the sides 12 and 22 and to the lower portions of the U-shaped member 19 are inclined gathering-chain-supporting members 23 and 24, respectively. Rotatably mounted on the inclined gathering-chain-supporting member 23 is a number of sprocket-idlers 25, around which the toothed gathering-chain 26 passes. Mounted on the gathering-chain-supporting member 24 is a series of sprocket-idlers 27, around which the toothed gathering-chain 28 passes. These two chains 26 and 28 are so mounted that they coact with each other as the machine is advanced over the ground-surface to draw the stalks between them and between the sides 12 and 22 of the stalk-receiving frame on the left side of the machine. Inasmuch as the members 23 and 24 are inclined from their rear ends downwardly to their forward ends and inasmuch as the toothed gathering-chains are driven in opposite directions these gathering-chains have a tendency to pick up any stalks and draw them upwardly as the machine is advanced over the ground-surface and cause said stalks to be forced between the sides 12 and 22 of the stalk-receiving frame.

Mounted on the side 12 and immediately beneath the extreme rear end of the inclined gathering-chain support 23 is the sprocket-wheel 29. Mounted adjacent to the rear end of the side 12 is another sprocket-wheel 30. Extending around these sprocket-wheels 29 and 30 is a toothed advancing-chain 31, so arranged that as it is driven the teeth on the chain will extend into the opening between the sides 12 and 22 of the stalk-receiving frame on the left side of the machine. Connecting the sprocket-wheel 29 with the most rearwardly sprocket-wheel 25 is the shaft 32, having a universal joint therein so arranged that as the sprocket-wheel 29 is rotated the sprocket-wheel 25 immediately above it will be rotated and cause the toothed gathering-chain 23 to be driven.

Rotatably mounted in the side 22 of the stalk-receiving frame and beneath the rear end of the inclined support 24 and the gathering-chain 28 is the sprocket-wheel 33. Mounted at the rear end of the side 22 is a sprocket-wheel 34. Passing around the sprocket-wheels 33 and 34 is a toothed chain 35, similar in construction to the chain 31 and designed to coact with it in advancing the stalks toward the rear of the machine as it is drawn over the ground-surface. Connecting the sprocket-wheel 27, which is at the upper rear end of the inclined support 24, with the sprocket-wheel 33 is the shaft 36, having the universal joint therein so arranged that as the sprocket-wheel 33 is rotated the sprocket-wheel 27, connected therewith, will be rotated, and thus cause the sprocket-chain to be driven and at the same time as the sprocket-chain is driven.

Mounted above the side 12 of the stalk-receiving frame and attached to the inside posts of the U-shaped portions 21 and 20 and inclined downwardly from its point of attachment to said post in the U-shaped portion 21 to a point beneath the rear upper ends of the inclined support 23 is the elevator-frame 37, having the elevating-conveyer 38 passing around it and extending longitudinally of it, said conveyer when driven being designed to receive the ears of corn dropped upon it by the snapping-bars, hereinafter described, and elevate said corn as it is drawn rearwardly to the rear of the machine and allow it to fall onto the side delivery-conveyer hereinafter described. Extending across the upper end of the machine is a shaft 39, having two sprocket-wheels 40 and 41 thereon, over which the sprocket-chains in the elevator pass and which drive said elevator when the shaft 39 is rotated. This shaft 39 extends entirely across the rear end of the machine and drives the elevators in the stalk-receiving frames on the right side of the machine as well as on the left side of the machine and in the same way. At the extreme left end of the shaft 39, outside of the stalk-receiving frame on the left side of the machine, is the bevel-gear 42. In mesh with the gear 42 is the bevel-gear 43, which is attached to the shaft 44, said shaft being rotatably mounted in the outer side of the U-shaped portion 21 and attached at its lower end by means of a universal joint to the sprocket-wheel 34, so that as the shaft 39 is driven the shaft 44 will be driven and the toothed advancing-chain 35 will also be driven at the same time.

Mounted on the shaft 39 and inside of the conveyer-frame 37 is the bevel-gear 45. Extending across the rear end of the frame, between the stalk-receiving frames and mounted in the sides 12 and 13 and the braces 17 and 18, is the crank-shaft 46. On the crank-shaft 46 and adjacent to the inside of the elevated frame 37 is a bevel gear-wheel 47. In mesh with gear-wheel 47 is the gear-wheel 48, which is attached to the shaft 49, and said shaft has the gear-wheel 50 at its upper rear end in mesh with the gear 45, so that as the crank-shaft 46 is driven the shaft 49 will be driven, and the shaft 39 will be also driven to drive the other parts of the device operatively connected with said shaft. Mounted on the left end of the shaft 46 is a gear $49^a$, which is in mesh with a bevel-gear $49^b$, attached to the lower end of the stub-shaft $49^c$, upon which the sprocket-wheel 30 is mounted, so that as the shaft 46 is driven the toothed advancing-chain 21 will be driven.

Extending across the rear end of the stalk-receiving frames and attached thereto is the inner section 51 of the side delivery-conveyer, the bottom portion 52 of said conveyer-casing being beneath the delivery ends of the elevating-conveyers in the stalk-receiving frames, said conveyer-casing being so arranged that the ears of corn will be fed from the elevators onto the conveyer, which passes over the conveyer-casing. Pivotally attached to the right end of the inner section 51 of the side delivery-conveyer casing is the outer section 53 of said casing. A bar 54 is attached to the inner end of the outer section 53 and extends upwardly therefrom. Mounted on the inner section 51 of the casing is the windlass 55. Connecting the windlass 55 with the bar 54 is a rope 56, said bar, windlass, and rope being designed to coöperate with each other in swinging the outer section 53 relative to the inner section 51 and maintain it in the desired position relative thereto. There is a ratchet-wheel connected with the windlass and is designed to be engaged by the pawl 57 to hold the windlass against rotary movement, and thus support the outer section 53 relative to the inner section 51. Passing around the sections 51 and 53 of the casing is an endless carrier-belt 58, which passes around the shaft 59, which is mounted at the extreme left end of the inner section 51 of the conveyer-casing and over sprocket-wheels mounted thereon, so that as the shaft 59 is driven the conveyer which passes over sprocket-wheels 60 at the outer end of the outer section 53 of the conveyer-casing will be also driven. On the extreme rear end of the shaft 59 is a sprocket-wheel 61, over which the sprocket-chain 62 passes. This sprocket-chain 62 also passes around the sprocket-wheel 63, which is mounted on the shaft 64, which shaft has a bevel-gear 65 at its forward end in mesh with a bevel-gear 66 on the shaft 46, so that as the shaft 46 is driven the sprocket-chain 62 will be driven, and the conveyer or carrier 59 will be also driven. Firmly mounted on the shaft 46 is the sprocket-wheel 67. Rotatably mounted on the shaft 14 is a sprocket-wheel 68, the hub of said wheel having a ratchet-face 69 on its right end. Passing around the sprocket-wheels 67 and 68 is a sprocket-chain 70, so arranged that as the sprocket-wheel 68 is driven the sprocket-wheel 67 will also be driven. Slidingly mounted on the shaft 14 and adjacent to the ratchet-faced end of the hub 69 is the ratchet-faced collar $70^a$, and the ratchet-face of said collar $70^a$ is normally held in engagement with the ratchet-face 69 or the hub of the sprocket-wheel 68 by the spring 71.

I have pivotally mounted a bell-crank lever 72 on the brace 18 in such a way that one end of said lever will enter a groove in the ratchet-faced collar $70^a$ and have attached an operating-rod 73 to the other end of said bell-crank lever, so that as the rod 73 is pulled rearwardly the bell-crank lever 72 will throw the ratchet-face of the collar $70^a$ out of engagement with the ratchet-face 69 of the hub of the sprocket-wheel 68. When the collar is out of engagement with the hub, the entire operative parts of the harvester will be thrown out of operation, and when the collar is in engagement with the hub of the sprocket-wheel 68 the operative parts of the mechanism will be thrown into operation as the machine is drawn over the ground-surface.

Extending longitudinally of the stalk-receiving frames and outside of the elevator-casing 37 are two snapping-bars 74 and 75, which are inclined from their upper rear ends to their lower forward ends and are mounted and operated as follows: A V-shaped block 76 is mounted between the upper forward ends of the side 12 and the lower forward portion of the support 24. A similar block 76 is also mounted between the forward upper portion of the side 22 and the forward lower portion of the support 24. Extending rearwardly from each of these blocks 76 is a bar 77, each of which is pivotally attached to the blocks 76. To the rear end of the bars 77 the snapping-bars 74 and 75 are pivotally attached. This pivotal attachment between the bar 77 and the snapping-bars 74 and 75 allows the bar to be moved in a vertical plane a certain distance. Extending across the upper forward portion of the U-shaped portion 21 is a rock-shaft 78, having the rock-arms 79 and 80 extending rearwardly therefrom and firmly attached thereto. The rear ends of the rock-arms 79 and 80 are connected by the shaft 81. Pivotally mounted on and depending from the shaft 81 and adjacent to the rock-arms 79 and 80, respectively, are the links 82 and 83. These links 82 and 83 are pivotally attached at their lower ends to the upper rear ends of the snapping-bars 74 and 75, respectively.

Mounted on the upper rear portion of the U-shaped portion 19 is the rock-shaft 84, having the rock-arms 85 and 86 mounted thereon. Connecting the free ends of the rock-arms 85 and 86 is the shaft 87. Pivotally mounted on and depending from the shaft 87 and connected with said shaft at a point adjacent to the rock-arm 85 is the link 88, which is firmly attached at its lower end to the snapping-bar 75. Pivotally mounted on the other end of the shaft 87 and depending therefrom is the link 89. Attached to the lower end of the link 89 is a substantially U-shaped metal piece 80, which extends from its point of attachment to the link 89 beneath the elevator-casing 37 and is attached at its other end to the snapping-bars 74. This U-shaped bar is far enough below the elevator-casing 37 to allow the vertical movement of the snapping-bar 74 when the rock-shaft is set into operation. Depending from, firmly attached to the shaft 84, and adjacent to its inner end is the link $90^a$. Depending from, firmly attached to, and adjacent to the inner end of the shaft 78 is the link 91. Pivotally connecting the free ends of the links $90^a$ and 91 is the bar 92 so arranged that as the shaft 78 is rocked the shaft 84 will be rocked at the same time. Firmly attached to and extending forwardly from the rock-shaft 78 and attached to its extreme inner end is the crank 93. Pivotally attached to the free end of the crank 93 and extending downwardly therefrom is the link 94, which has the crank 95 of the crank-shaft 46 rotatably mounted in its lower end, so that as the crank-shaft 46 is rotated the link 94 will be moved upwardly and downwardly, will cause the free end of the crank 93 to be moved upwardly and downwardly, and this will cause the rock-shafts 81 and 84 to be operated and cause the snapping-bars to be moved forwardly and downwardly, so that as the harvester is advanced over the ground-surface the stalks of corn will be drawn between the gathering-arms and between the inclined snapping-bars 74 and 75, and when the machine reaches the point where the ears of corn come in contact with the snapping-bar the constant vertical movement of these bars will cause the ear of corn to be suddenly engaged and the consequent snapping of the ears of corn from the stalks. Attached to the upper edge of the snapping-bar 75 and extending outwardly and upwardly therefrom is the deflector 96, so arranged that the ears of corn when they are snapped from the stalk will be always thrown toward the conveyer 38.

Connecting the upper rear portion of the U-shaped portion 21 with the shaft 81 is a spring 97, which is designed to normally force the snapping-bars upwardly and cause a quick upward movement of the bars as soon as they are released from their lower limit of movement, to which they are drawn by the crank-shaft. This spring also serves to steady the action of the snapping-bars. Attached to the innermost post of the U-shaped portion 19 and adjacent to its lower end is the snapping-bar adjuster 98, which is so arranged that it can be moved toward the snapping-bars to adjust the bar 74 toward the bar 75, so that if the general run of the ears of corn to be snapped is small the snapping-bars 74 may be moved very close to the bar 75, while if the general run of the ears is large the snapping-bars 74 and 75 may be allowed to operate at a maximum distance away from each other. The snapping-bar 74 is loosely mounted, so that the snapping-bar may be moved horizontally slightly, so as to be capable of a slight movement toward or away from the snapping-bars 75 and may be maintained at a greater or less distance from the bar 75 by the adjuster 98. Attached to the outer side of each of the stalk-receiving frames is a shield 99, which is also designed to prevent any ears of corn from being thrown to the outside of the machine by the snapping-bars. It will be seen in the operation of this machine that as the machine is advanced over the ground-surface and as there are two of these complete stalk-receiving frames and attachments thereto that two rows of corn will be harvested as the machine is moved over the ground-surface, each row of corn being first grasped by the toothed gathering-chains 26 and 28, and then these rows of corn will pass between the snapping-bars 74 and 75 as the machine is advanced and the ears of corn will be snapped from the stalks regardless of their height on the stalks from the ground-surface, owing to the fact that these snapping-bars are inclined and have their lower forward ends adjacent to the ground-surface and their upper rear ends at sufficient distance from the ground-surface to be adapted for use in corn of any height and to take the ears of corn from the stalks regardless of the height of these ears of corn from the ground. The quick upward motion of the snapping-bars caused by the rapid rotation of the crank-shaft 46 being very effective to snap the ears from the stalks. As soon as the ears are snapped from the stalks they are thrown onto the elevators 38 and by these elevators are delivered onto the conveyer 58 and to a wagon which is drawn beside the harvester and is beneath the delivery end of the conveyer 58. Thus my harvester not only snaps the ears of corn from the two rows, but also delivers the ears of corn thus harvested into a wagon.

Pivotally attached to the rear of the main frame is an auxiliary frame 100, to which the seat 101 is firmly attached. The swiveled wheel 102 is connected with the rear end of this frame and is designed to support the rear end of the machine. Extending rearwardly from the main frame is an arm 103, to which the auxiliary frame is pivotally attached adjacent to the main frame. Pivotally connected with the extreme rear end of the arm 103 is the bell-crank lever 104, having the spring-pressed pawl 105 slidingly mounted thereon and having the ordinary handpiece pivotally attached to its upper end and said handpiece and the spring-actuated pawl connected by the lever 106. The spring-pressed pawl 105 is designed to engage the notches in the notched sector 107, which is attached to the auxiliary frame. This notched sector and the bell-crank lever, with its attachments, are designed to hold the auxiliary frame in position relative to the main frame, so that at the pleasure of the operator the forward end of the main frame and the gathering-arms, which are mounted thereon, may be swung upwardly and downwardly relative to the ground-surface while the machine is in operation, so that the forward ends of the stalk-receiving frames may be thrown very close to the ground-surface or some distance away from it at the pleasure of the operator while the machine is in full operation.

Attached to the upper end of the swivel of the swiveled wheel 102 is the guide-bar 108, so arranged and constructed that by turning the guide-bar the wheel 102 may be turned, so as to guide the machine as it is advanced over the ground-surface in the desired directions.

The ordinary whiffletrees 109 are attached to the outside of each of the stalk-receiving frames, to which the draft-animals may be attached, which are used in drawing the harvester over the ground-surface.

At the top of the stalk-receiving frame a roof 110 may be placed if it is desired to protect the machinery.

Having thus described my invention, what I claim, and desire to secure by Letters Patent of the United States therefor, is—

1. In a corn-harvester, a frame mounted on traction-wheels, stalk-receiving frames connected with the main frame and at each side thereof, inclined snapping-bars in the stalk-receiving frames, means for reciprocating vertically the snapping-bars as the harvester is advanced over the ground-surface, toothed gathering-chains driven from the traction-wheels mounted in front of and partially above the snapping-bars, an elevator driven from the traction-wheels, mounted in each of the stalk-receiving frames and inside of the snapping-bars, and toothed advancing-chains mounted beneath the snapping-bars and driven from the traction-wheels.

2. In a corn-harvester, a frame mounted on traction-wheels, stalk-receiving frames connected with the main frame and at each side thereof, inclined snapping-bars in the stalk-receiving frames, means for reciprocating vertically the snapping-bars as the harvester is advanced over the ground-surface, toothed gathering-chains driven from the traction-wheels mounted in front of and partially above the snapping-bars, an elevator in each stalk-receiving frame, a lateral conveyer mounted at the rear of the stalk-receiving frame and partially beneath the delivery ends of the elevators and driven from the traction-wheels, and toothed advancing-chains mounted beneath the snapping-bars and driven from the traction-wheels.

3. In a corn-harvester, a frame mounted on traction-wheels, stalk-receiving frames connected with the main frame and at each side thereof, inclined snapping-bars in the stalk-receiving frames, means for reciprocating vertically the snapping-bars as the harvester is advanced over the ground-surface, means for adjusting the snapping-bars in each frame toward each other, and means mounted at the rear of the main frame for guiding the harvester as it is advanced over the ground-surface.

4. In a corn-harvester, a frame mounted on traction-wheels, stalk-receiving frames connected with the main frame and at each side thereof, inclined snapping-bars in the stalk-receiving frames, means for reciprocating vertically the snapping-bars as the harvester is advanced over the ground-surface, an elevator driven from the traction-wheels mounted in each of the stalk-receiving frames and inside of the snapping-bars, and means mounted at the rear of the main frame for guiding the harvester as it is advanced over the ground-surface.

5. In a corn-harvester, a frame mounted on traction-wheels, stalk-receiving frames connected with the main frame and at each side thereof, inclined snapping-bars in the stalk-receiving frames, means for reciprocating vertically the snapping-bars as the harvester is advanced over the ground-surface, an elevator driven from the traction-wheels mounted in each of the stalk-receiving frames and inside of the snapping-bars, and a lateral conveyer mounted at the rear of the stalk-receiving frames and partially beneath the delivery ends of the elevators and driven from the traction-wheels, and means mounted at the rear of the main frame for guiding the harvester as it is advanced over the ground-surface.

6. In a corn-harvester, a frame mounted on traction-wheels, stalk-receiving frames connected with the main frame and at each side thereof, inclined snapping-bars in the stalk-receiving frames, means for reciprocating vertically the snapping-bars as the harvester is advanced over the ground-surface, toothed gathering-chains driven from the traction-wheels mounted in front of and partially above the snapping-bars, an elevator driven from the traction-wheels, mounted in each of the stalk-receiving frames and inside of the snapping-bars, and means mounted at the rear of the main frame for guiding the harvester as it is advanced over the ground-surface.

7. In a corn-harvester, a frame mounted on traction-wheels, stalk-receiving frames connected with the main frame and at each side thereof, inclined snapping-bars in the stalk-receiving frames, means for reciprocating vertically the snapping-bars as the harvester is advanced over the ground-surface, toothed gathering-chains driven from the traction-wheels mounted in front of and partially above the snapping-bars, a lateral conveyer mounted at the rear of the stalk-receiving frames and partially beneath the delivery ends of the elevators and driven from the traction-wheels, an auxiliary frame pivoted to the rear end of said frame, a swiveled wheel in the auxiliary frame, and means connected with the auxiliary frame and the main frame for raising and lowering the forward ends of the main frame.

8. In a corn-harvester, a frame mounted on traction-wheels, stalk-receiving frames connected with the main frame and at each side thereof, inclined snapping-bars in the stalk-receiving frames, means for reciprocating vertically the snapping-bars as the harvester is advanced over the ground-surface, toothed gathering-chains driven from the traction-wheels mounted in front of and partially above the snapping-bars, an elevator driven from the traction-wheels, mounted in each of the stalk-receiving frames and inside of the snapping-bars, toothed advancing-chains mounted beneath the snapping-bars and driven from the traction-wheels, an auxiliary frame pivoted to the rear end of said frame, a swiveled wheel in the auxiliary frame, and means connected with the auxiliary frame and the main frame for raising and lowering the forward ends of the main frame.

9. In a corn-harvester, a frame mounted on traction-wheels, stalk-receiving frames connected with the main frame and at each side thereof, inclined snapping-bars in the stalk-receiving frames, means for reciprocating vertically the snapping-bars as the harvester is advanced over the ground-surface, toothed gathering-chains driven from the traction-wheels mounted in front of and partially above the snapping-bars, a lateral conveyer mounted at the rear of the stalk-receiving frames and partially beneath the delivery ends of the elevators and driven from the traction-wheels, toothed advancing-chains mounted beneath the snapping-bars and driven from the traction-wheels, an auxiliary frame pivoted to the rear end of said frame, a swiveled wheel in the auxiliary frame and means connected with the auxiliary frame and the main frame for raising and lowering the forward ends of the main frame.

10. In a corn-harvester, snapping-bars pivoted at each end, means for moving the entire snapping-bars upwardly and downwardly, adjustable means for holding one of the snapping-bars in position relative to the other.

11. In a corn-harvester, a frame, two bars pivotally attached near the forward end of the frame, snapping-bars pivotally attached to the rear ends of the said bars and inclined upwardly from their pivotal points of attachment to the bars, means for pivotally supporting the rear upper ends of the snapping-bars, means for supporting the lower ends of the snapping-bars and means for moving the snapping-bars upwardly and downwardly.

HERBERT B. WYCKOFF.

Witnesses:
 JOHN C. ASHBY,
 M. H. BEER.